(12) United States Patent
Beilman et al.

(10) Patent No.: US 11,872,926 B2
(45) Date of Patent: Jan. 16, 2024

(54) VEHICLE FRONT END TIE DOWN ASSEMBLIES

(71) Applicant: FORD GLOBAL TECHNOLOGIES, LLC, Dearborn, MI (US)

(72) Inventors: Mark Beilman, South Lyon, MI (US); Scott Stinson, Livonia, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 0 days.

(21) Appl. No.: 17/675,173

(22) Filed: Feb. 18, 2022

(65) Prior Publication Data

US 2022/0169168 A1   Jun. 2, 2022

Related U.S. Application Data

(62) Division of application No. 16/583,492, filed on Sep. 26, 2019, now Pat. No. 11,285,860.

(51) Int. Cl.
*B60P 7/08* (2006.01)
*B60R 11/00* (2006.01)
*B62D 25/18* (2006.01)

(52) U.S. Cl.
CPC ............ *B60P 7/0807* (2013.01); *B60R 11/00* (2013.01); *B62D 25/18* (2013.01); *B60R 2011/004* (2013.01); *B60R 2011/0066* (2013.01)

(58) Field of Classification Search
CPC ............. B60P 7/0807; B60R 2011/004; B60R 2011/0066; B62D 25/18
USPC ........................................................ 410/101
See application file for complete search history.

(56) References Cited

U.S. PATENT DOCUMENTS

| | | | |
|---|---|---|---|
| 2,635,796 A | 4/1953 | Davolt | |
| 3,233,934 A | 2/1966 | Osborn et al. | |
| 4,077,553 A | 3/1978 | Miller | |
| 4,108,342 A | 8/1978 | Riva | |
| 4,288,188 A | 9/1981 | Smith | |
| 4,596,348 A | 6/1986 | Stamp | |
| 5,029,785 A | 7/1991 | Besong, Jr. | |
| 5,069,377 A * | 12/1991 | Baughman | B60R 9/00 410/101 |
| 5,328,067 A | 7/1994 | Lalush | |
| 5,476,349 A * | 12/1995 | Okland | B60P 7/0815 410/101 |
| 5,730,346 A | 3/1998 | Adams et al. | |
| 8,517,461 B2 | 8/2013 | Huber | |
| 10,759,330 B1 * | 9/2020 | Salter | B60Q 1/2611 |
| 10,875,461 B2 | 12/2020 | Salter et al. | |
| 2005/0057076 A1 * | 3/2005 | Roux | B62D 25/163 296/187.04 |
| 2006/0226188 A1 * | 10/2006 | Smith | B60R 9/04 224/326 |

* cited by examiner

*Primary Examiner* — Hilary L Gutman
(74) *Attorney, Agent, or Firm* — Vichit Chea; Carlson, Gaskey & Olds, P.C.

(57) ABSTRACT

Vehicle tie down assemblies may be provided for securing cargo and/or accessories at vehicle front ends. The tie down assemblies may be mounted to a vehicle fender without obstructing the opening and closing of the vehicle hood. Exemplary vehicle tie down assemblies may embody a multi-piece design that establishes a pass-through for receiving various tie downs. The tie down assemblies may additionally include one or more bolt assemblies for mounting accessories.

7 Claims, 4 Drawing Sheets

VEHICLE FRONT END TIE DOWN ASSEMBLIES

CROSS REFERENCE TO RELATED APPLICATION

This is a divisional of U.S. patent application Ser. No. 16/583,492, which was filed on Sep. 26, 2019.

TECHNICAL FIELD

This disclosure relates to tie down assemblies for mounting accessories and/or cargo relative to vehicle front ends.

BACKGROUND

Vehicle users may desire to mount and/or transport various types of cargo and accessories using their respective vehicles. Numerous accessory devices (e.g., tie-downs, roof racks, etc.) are commonly employed for transporting the cargo.

SUMMARY

A vehicle tie down assembly according to an exemplary aspect of the present disclosure includes, among other things, a base plate, an overmold received over the base plate, and a cover received over the overmold. Together, the base plate, the overmold, and the cover establish a pass-through that is sized to accommodate a tie down.

In a further non-limiting embodiment of the foregoing vehicle tie down assembly, the base plate is a metallic structure and the overmold and the cover are plastic structures.

In a further non-limiting embodiment of either of the foregoing vehicle tie down assemblies, together, the base plate, the overmold, and the cover establish a hole that is configured for receiving a bolt assembly.

In a further non-limiting embodiment of any of the foregoing vehicle tie down assemblies, the base plate includes a first flange, a second flange, and a third flange. Each of the first flange, the second flange, and the third flange receives a fastener.

In a further non-limiting embodiment of any of the foregoing vehicle tie down assemblies, the overmold includes a locator pin.

In a further non-limiting embodiment of any of the foregoing vehicle tie down assemblies, the overmold includes a plurality of tabs that protrude transversely from the overmold.

In a further non-limiting embodiment of any of the foregoing vehicle tie down assemblies, the overmold includes a first hollowed section sized to receive the base plate, and the cover includes a second hollowed section sized to receive the overmold.

In a further non-limiting embodiment of any of the foregoing vehicle tie down assemblies, the cover includes a flange that protrudes transversely from a lower section of a base portion of the cover, a nose portion of the cover, or both.

In a further non-limiting embodiment of any of the foregoing vehicle tie down assemblies, each of the base plate, the overmold, and the cover includes a base portion and a nose portion that extends away from the base portion.

In a further non-limiting embodiment of any of the foregoing vehicle tie down assemblies, the pass-through is formed through the base portions, and the nose portions are curved to match a contour of a vehicle fender.

A vehicle according to another exemplary aspect of the present disclosure includes, among other things, a fender including an inner shelf and a tie down assembly mounted to the inner shelf. The tie down assembly includes a base portion and a nose portion. A pass-through is formed through the base portion, and a bolt assembly is received within a hole formed through the base portion.

In a further non-limiting embodiment of the foregoing vehicle, the inner shelf is supported by a fender support bracket.

In a further non-limiting embodiment of either of the foregoing vehicles, a fender stiffener extends between the inner shelf and the fender support bracket.

In a further non-limiting embodiment of any of the foregoing vehicles, the tie down assembly is mounted to each of the inner shelf, the fender support bracket, and the fender stiffener.

In a further non-limiting embodiment of any of the foregoing vehicles, the tie down assembly includes a first flange that extends transversely from the nose portion, a second flange that extends transversely from the base portion, and a third flange that extends transversely from the base portion.

In a further non-limiting embodiment of any of the foregoing vehicles, the first flange includes a first opening configured to receive a first fastener, the second flange includes a second opening configured to receive a second fastener, and the third flange includes a third opening configured to receive a third fastener.

In a further non-limiting embodiment of any of the foregoing vehicles, the first fastener extends through a tab of the inner shelf and then through a fender stiffener, the second fastener extends through the fender stiffener and a fender support bracket, and the third fastener extends through the inner shelf and the fender support bracket.

In a further non-limiting embodiment of any of the foregoing vehicles, the base portion of the tie down assembly includes a locator pin received within a locating hole formed in the inner shelf.

In a further non-limiting embodiment of any of the foregoing vehicles, the bolt assembly is removable from the hole and includes a bolt and a barrel nut.

In a further non-limiting embodiment of any of the foregoing vehicles, the vehicle includes a second fender having a second inner shelf and a second tie down assembly mounted to the second inner shelf. The tie down assembly and the second tie down assembly are mounted at opposite corners of a front end section of the vehicle.

The embodiments, examples and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

The various features and advantages of this disclosure will become apparent to those skilled in the art from the following detailed description. The drawings that accompany the detailed description can be briefly described as follows.

DETAILED DESCRIPTION

This disclosure details vehicle tie down assemblies for securing cargo and/or accessories at the front ends of vehicles. The tie down assemblies may be mounted to a vehicle fender without obstructing the opening and closing of the vehicle hood. Exemplary vehicle tie down assemblies may embody a multi-piece design that establishes a pass-through for receiving various tie downs. The tie down assemblies may additionally include one or more bolt assemblies for mounting accessories. These and other features of this disclosure are described in greater detail below.

Figure 1:
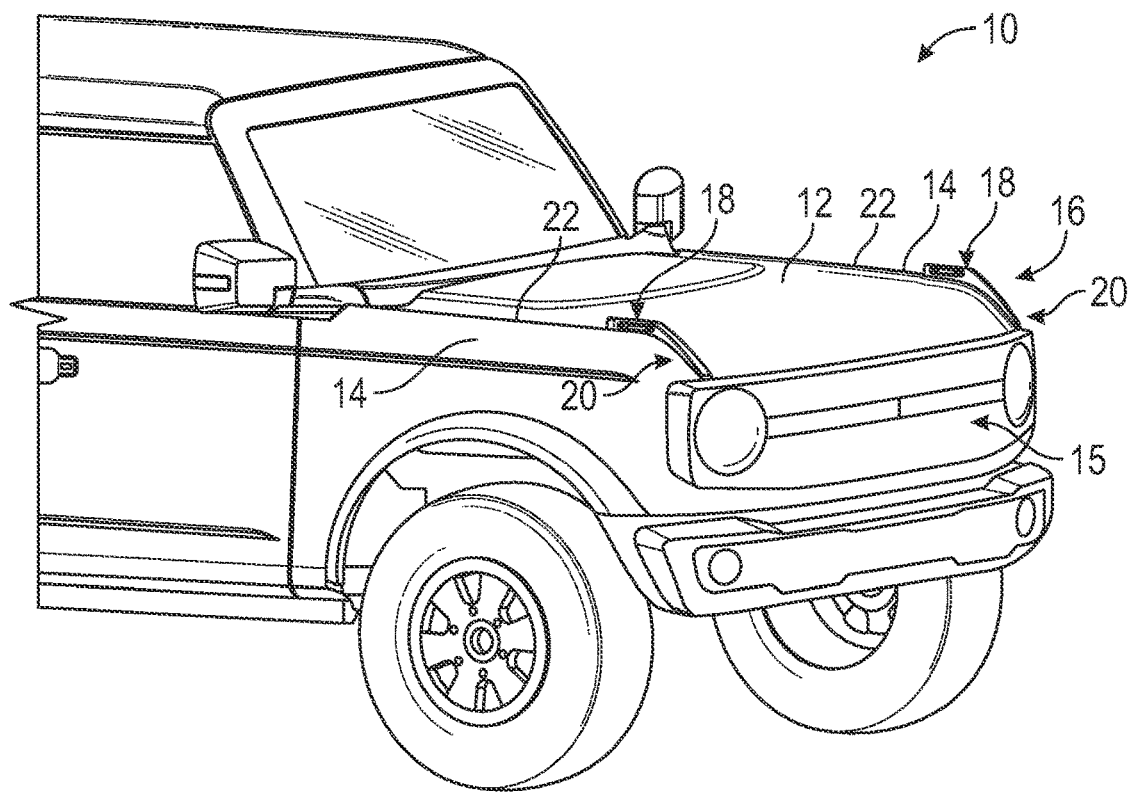
FIG. 1 is a front perspective view of a vehicle equipped with a pair of tie down assemblies.

FIG. 1 illustrates select portions of a vehicle 10. The vehicle 10 may be a sport utility vehicle (SUV), a crossover, a car, a van, or any other type of vehicle. The vehicle 10 could also be a conventional motor vehicle, a battery powered hybrid or electric vehicle, or an autonomous vehicle (i.e., a driverless vehicle).

Although a specific component relationship is illustrated in the figures of this disclosure, the illustrations are not intended to limit this disclosure. The placement and orientation of the various components of the vehicle 10 are shown schematically and could vary within the scope of this disclosure. In addition, the various figures accompanying this disclosure are not necessarily to scale, and some features may be exaggerated or minimized to emphasize certain details of a particular component.

The vehicle 10 includes a hood 12 that is movably mounted between left and right side fenders 14 at a front end portion 16 of the vehicle 10. The hood 12 may be opened to access an inner compartment (e.g., an engine compartment) of the vehicle 10.

One or more tie down assemblies 18 may be provided at the front end portion 16 of the vehicle 10. Each tie down assembly 18, which may also be referred to as tie down hook assemblies, may function both as a styling element of the vehicle 10 and as a securement point for securing cargo and/or accessories relative to the vehicle 10. In an embodiment, one tie down assembly 18 is mounted near each front corner 20 of the front end portion 16. The tie down assemblies 18 may be mounted within a cut-line 22 formed between the hood 12 and fenders 14, for example.

Figure 2:
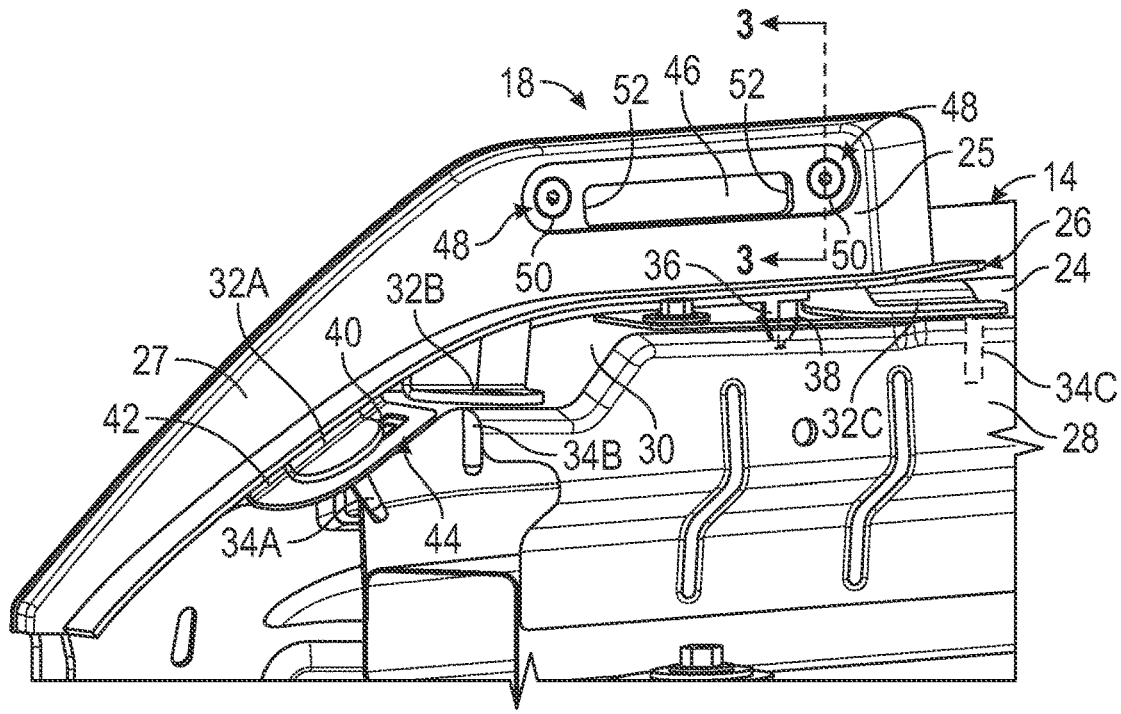
FIG. 2 is an interior side view of a tie down assembly mounted to the vehicle of FIG. 1.

FIG. 2, with continued reference to FIG. 1, illustrates a mounted position of one of the tie down assemblies 18 of the vehicle 10. Although only one tie down assembly 18 is shown in FIG. 2, additional tie down assemblies could be mounted to the inner structure of the vehicle 10 in a similar manner to that shown in FIG. 2.

The exemplary tie down assembly 18 may be secured relative to an inner shelf 24 of an inner portion 26 of one of the fenders 14. The inner shelf 24 is a fixed part of the vehicle 10 that is accessible upon opening the hood 12. The inner shelf 24 may be supported by a fender support bracket 28, and a fender stiffener 30 may be at least partially positioned between the inner shelf 24 and the fender support bracket 28. The fender stiffener 30 helps to maintain the shape of the fender 14.

The tie down assembly 18 is secured to the vehicle structure such that the hood 12 may close without obstruction. The tie down assembly 18 may include a base portion 25 and a nose portion 27 that extends from the base portion 25. The nose portion 27 may be at least partially curved to follow a contour of the fender 14. The nose portion 27 may terminate just prior to a grille assembly 15 of the vehicle 10 (see FIG. 1), and the base portion 25 may extend any distance from the nose portion 27 in a direction toward a windshield of the vehicle 10 (see FIG. 1).

The tie down assembly 18 may include multiple flanges 32A, 32B, and 32C that include openings for receiving fasteners 34A, 34B, and 34C, respectively, for securement to the inner structure of the vehicle 10. The flanges 32A, 34B, and 34C are arranged and configured to avoid obstructing the opening and closing of the hood 12.

In an embodiment, the fastener 34A is received through the flange 32A and then extends through a tab 42 of the fender 14 and through the fender stiffener 30, the fastener 34B extends through the flange 32B and then through each of the fender stiffener 30 and the fender support bracket 28, and the fastener 34C extends through the flange 32C, then through the inner shelf 24, and then into the fender support bracket 28 in order to secure the tie down assembly 18 to the vehicle structure. The fasteners 34A, 34B, and 34C may be studs, bolts, or any other fasteners or combinations of fasteners.

The tie down assembly 18 may additionally include a locator pin 36 for locating the base portion 25 of the tie down assembly 18 relative to the inner shelf 24 of the inner portion 26 of the fender 14. The locator pin 36 may be received within a locating hole 38 that is formed through each of the inner shelf 24, the fender stiffener 30, and the fender support bracket 28. The locator pin 36 locates the base portion 25 of the tie down assembly 18 relative to the fender 14 in each of the forward, backward, left, and right directions and may therefore be considered a four-way locator pin.

In another embodiment, the fastener 34A may act as an additional locator for locating the nose portion 27 of the tie down assembly 18 relative to the inner shelf 24. The fastener 34A may be, for example, a locating stud that is received within a locating slot 40 that is formed through the tab 42 of the fender 14 and a distal portion 44 of the fender stiffener 30. The fastener 34A may locate the nose portion 27 relative to the fender 14 in each of the left and right directions and is therefore considered a two-way locator.

The base portion 25 of the tie down assembly 18 may include a pass-through 46. The pass-through 46 may be elongated to enable the securement of lines, straps, ratchets, hooks, and other tie down structures. In an embodiment, the pass-through 46 is an enclosed, elongated opening defined within the base portion 25 of the tie down assembly 18.

The pass-through 46 may be sized to accommodate tie down structures of various sizes. However, the pass-through 46 is generally not large enough to accommodate a user's fingers or larger tie down structures in order to avoid imparting relatively large loads to the hood 12 and/or fender 14.

Figure 3:
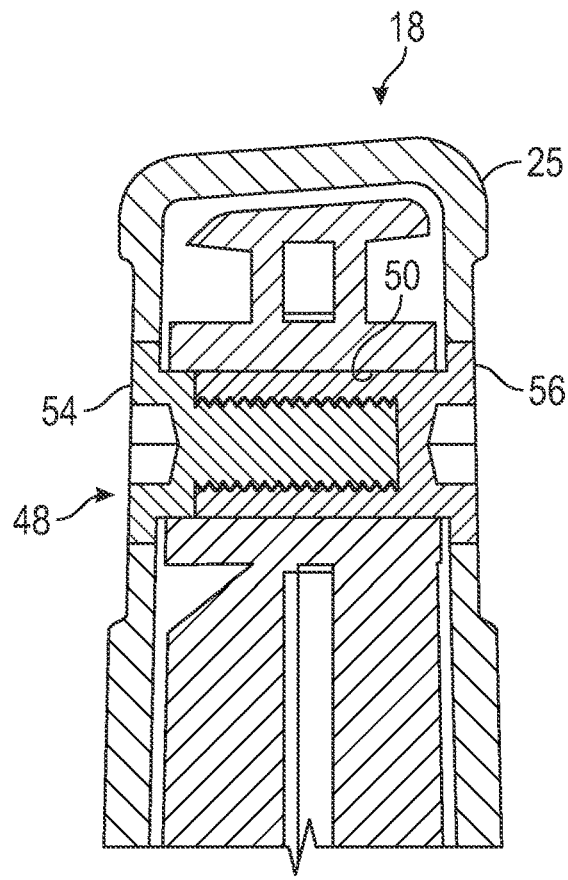
FIG. 3 is a cross-sectional view through section 3-3 of FIG. 2.

Referring now to FIGS. 2-3, the tie down assembly 18 may additionally include one or more bolt assemblies 48 for mounting accessories (e.g., flags, lights, cameras, antennas, etc.) relative to the vehicle 10. The bolt assemblies 48 may be accommodated within holes 50 formed through the base portion 25. In an embodiment, the tie down assembly 18 includes two bolt assemblies 48, with one bolt assembly 48 being located adjacent to each opposing end 52 of the pass-through 46.

Each bolt assembly 48 may include a bolt 54 and a barrel nut 56. The barrel nut 56 receives the bolt 54 to secure the bolt 54 within the hole 50. The barrel nut 56 may be received within the hole 50 so that the bolt 54 does not protrude outside of the hole 50 over the hood 12. The bolt assemblies 48 therefore do not interfere with the opening/closing of the hood 12. The bolt 54 and the barrel nut 56 may be removed from the base portion 25 to provide pass-through access to the hole 50, may be removed and replaced with another bolt or holding device for securing an accessory device, or may be removed and then be reinserted into the hole 50 for securing an accessory device.

Figure 4:
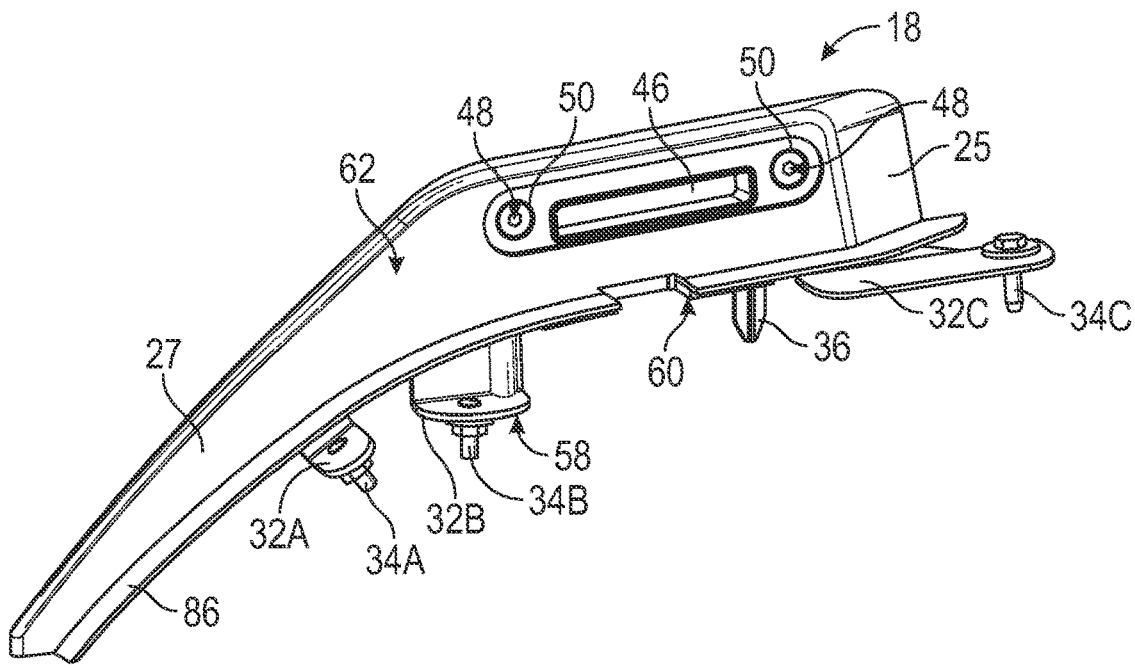
FIG. 4 illustrates an exemplary tie down assembly.
Figure 5:
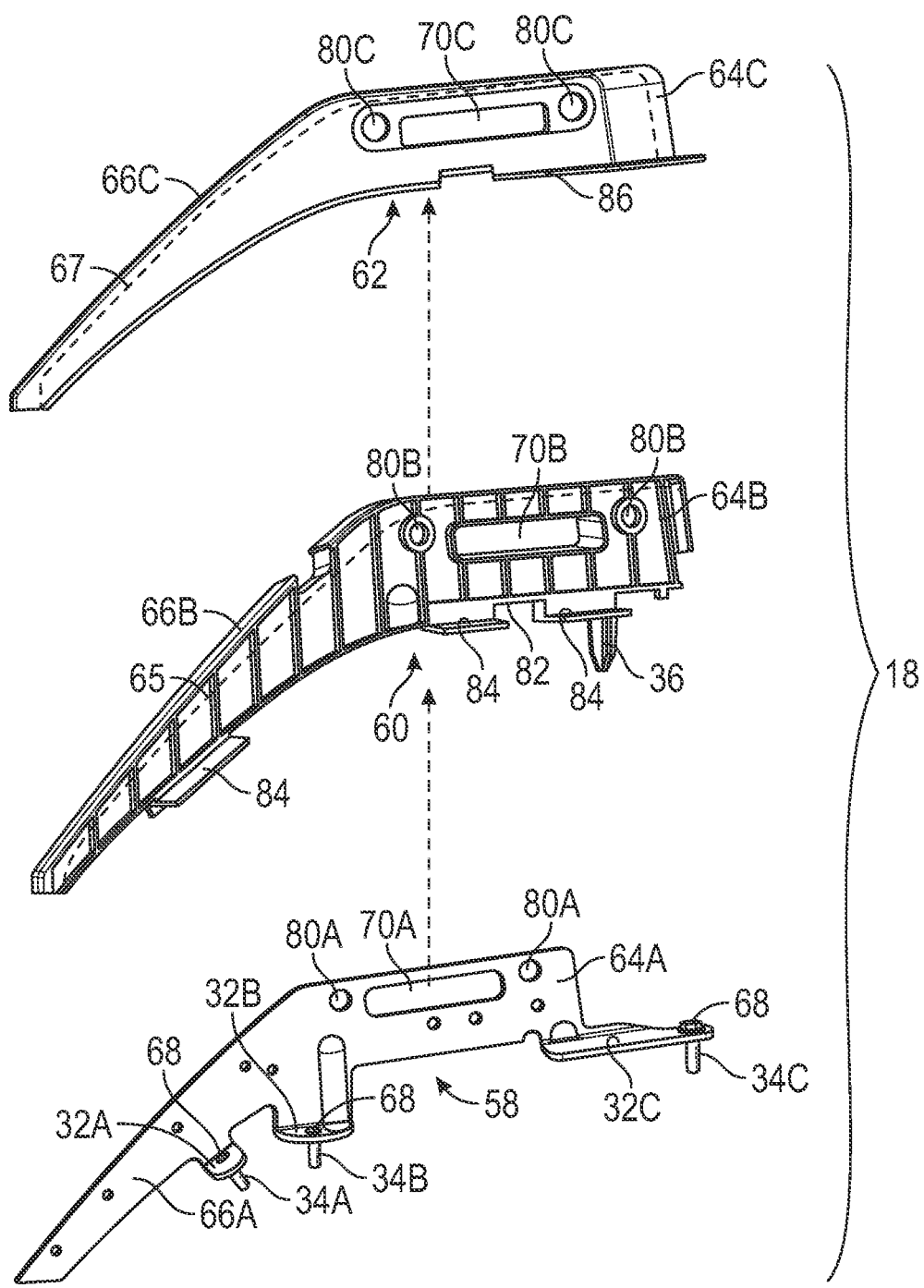
FIG. 5 is an exploded view of the tie down assembly of FIG. 4.

FIGS. 4-5 illustrate additional design details of the exemplary tie down assembly 18 described above. The tie down assembly 18 may include a base plate 58, an overmold 60, and a cover 62. Together, the base plate 58, the overmold 60, and the cover 62 establish the tie down assembly 18.

The base plate 58 may be stamped or otherwise constructed out of a metallic material. In an embodiment, the base plate 58 is made of steel. However, other materials and manufacturing techniques may be employed to manufacture the base plate 58.

The base plate 58 may include a base portion 64A and a nose portion 66A. In an embodiment, the flange 32A extends transversely from the nose portion 66A, and the flanges 32B and 32C extend transversely from the base portion 64A. However, other configuration are also contemplated within the scope of this disclosure. The fasteners 34A, 34B, and 34C may be either press fit or welded within openings 68 formed through each of the flanges 32A, 32B, and 32C.

The base portion 64A of the base plate 58 may include a pass-through 70A. The pass-through 70A may be an enclosed, elongated opening defined within the base portion 64A of the base plate 58. One or more holes 80A may be formed through the base portion 64A. In an embodiment, one hole 80A is disposed adjacent to each opposing end of the pass-through 70A.

The overmold 60 may be molded or otherwise constructed out of a plastic material. However, other materials and manufacturing techniques may be employed to manufacture the overmold 60.

The overmold 60 may be received over the base plate 58. The overmold 60 may include a hollowed interior 65 that is sized to accommodate the base plate 58. In an embodiment, the overmold 60 is attached to the base plate 58. In another embodiment, the overmold 60 covers a majority of the surface area of the base plate 58 once received over the base plate 58. However, the flanges 32A, 32B, and 32C are not covered by the overmold 60 (i.e., the flanges protrude outside of the overmold 60).

The overmold 60 may include a base portion 64B and a nose portion 66B. In an embodiment, the locator pin 36 protrudes from an undersurface 82 of the base portion 64B. In another embodiment, the locator pin 36 protrudes a tab 84. One or more tabs 84 may extend transversely from the base portion 64B, the nose portion 66B, or both.

The base portion 64B of the overmold 60 may include a pass-through 70B. The pass-through 70B may be an enclosed, elongated opening defined within the base portion 64B of the overmold 60. One or more holes 80B may be formed through the base portion 64B. In an embodiment, one hole 80B is disposed adjacent to each opposing end of the pass-through 70B. Once the overmold 60 is received over the base plate 58, the pass-through 70B is substantially aligned with the pass-through 70A and the holes 80B are substantially aligned with the holes 80A.

The cover 62 may be molded or otherwise constructed out of a plastic material. However, other materials and manufacturing techniques may be employed to manufacture the overmold cover.

The cover 62 may be received over the overmold 60 (which, in some embodiments, has already been received over the base plate 58). The cover 62 may include a hollowed interior 67 that is sized to accommodate the overmold 60. In an embodiment, the cover 62 is welded or bonded to the overmold 60.

In an embodiment, the cover 62 covers a majority of the surface area of the overmold 60 and the base plate 58 once received over the overmold 60. However, at least the locator pin 36 of the overmold 60 and the flanges 32A, 32B, and 32C of the base plate 58 are not covered by the cover 62 when the parts of the tie down assembly 18 are all assembled together (see, e.g., FIG. 4).

The cover 62 may include a base portion 64C and a nose portion 66C. In an embodiment, a flange 86 extends transversely from a lower section of one or both of the base portion 64C and the nose portion 66C. The flange 86 may abut against the tabs 84 of the overmold 60 to limit the insertion distance of the cover 62 as it is received over the overmold 60.

The base portion 64C of the cover 62 may include a pass-through 70C. The pass-through 70C may be an enclosed, elongated opening defined within the base portion 64C of the cover 62. One or more holes 80C may be formed through the base portion 64C. In an embodiment, one hole 80C is disposed adjacent to each opposing end of the pass-through 70C. Once the cover 62 is received over the overmold 60, the pass-through 70C is substantially aligned with the pass-throughs 70A, 70B and the holes 80C are substantially aligned with the holes 80A, 80B. The pass-throughs 70A, 70B, 70C thereby establish the pass-through 46 of the tie down assembly 18, and the holes 80A, 80B, and 80C thereby establish the holes 50 of the tie down assembly 18. Once the base plate 58, the overmold 60, and the cover 62 are assembled together in the manner shown in FIG. 4, the bolt assemblies 48 may be positioned within the holes 50.

Figure 6A:
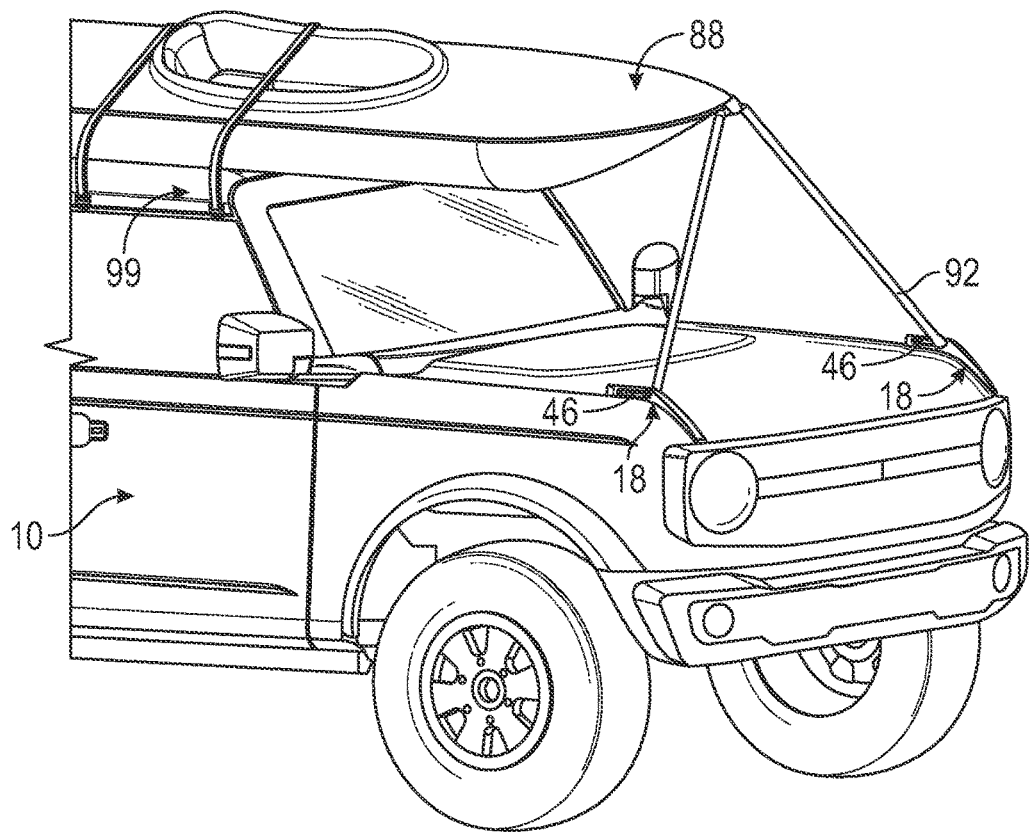
FIGS. 6A and 6B schematically illustrate exemplary uses of vehicle front end tie down assemblies.
Figure 6B:
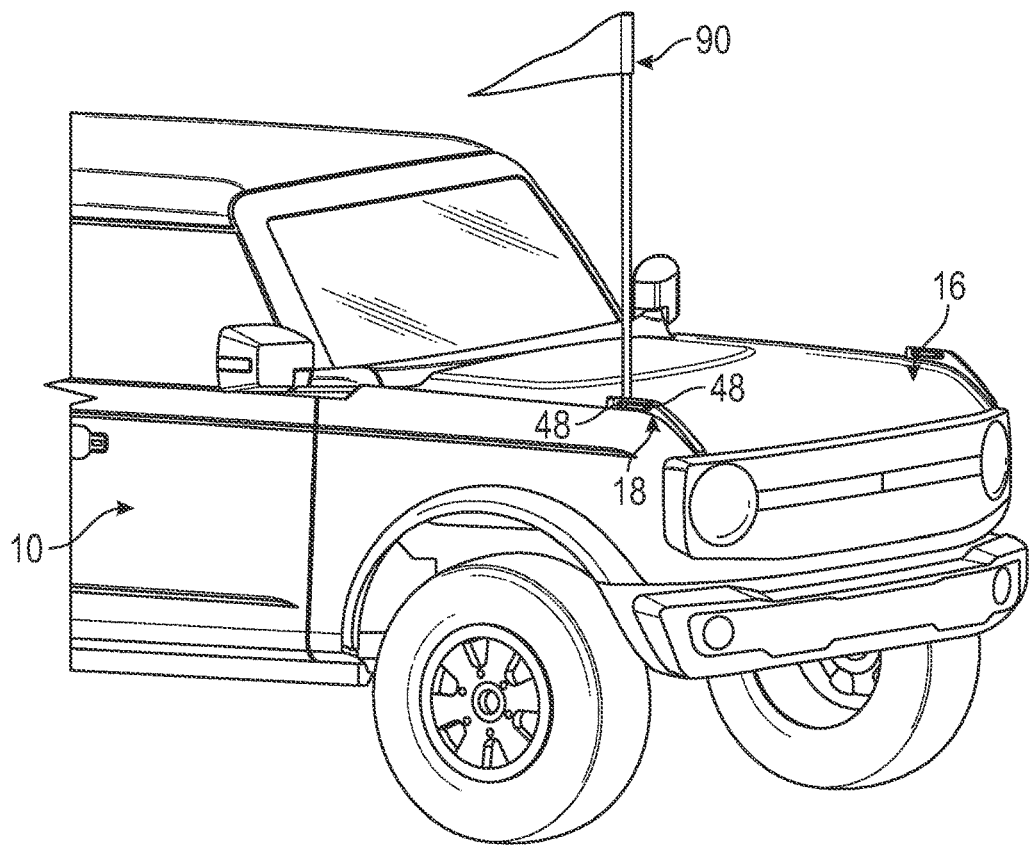

Referring now to FIGS. 6A and 6B, the tie down assemblies 18 described above may be used to secure one or more cargo items 88 atop a roof 99 of the vehicle 10 and/or to secure one or more accessories 90 to the front end portion 16 of the vehicle 10. The cargo item(s) 88 could be any cargo (e.g., long stock (e.g., lumber), boats, kayaks, lawn tools, etc.) that the owner of the vehicle 10 desires to haul atop the roof 99. The accessories 90 could by any accessories (flags, lights, cameras, antennas, etc.) that the owner of the vehicle 10 desires to secure to the front end portion 16 of the vehicle 10.

Referring first to FIG. 6A, a cargo item 88 is shown secured relative to the roof 99 of the vehicle 10 using a set of two tie-down assemblies 18. A tie down 92 (e.g., a strap) may be wrapped around or otherwise secured near an end of the cargo item 88 and then attached to each of the tie down assemblies 18 to secure the cargo item 88 in place over top of the front end portion 16. In an embodiment, the tie down 92 is passed through the pass-throughs 46 of the tie down assemblies 18.

Referring to FIG. 6B, an accessory 90 (here, a flag) is shown secured relative to the front end portion 16 of the vehicle using a tie down assembly 18. The accessory 90 may be secured to the tie down assembly 18 by using one or more of the bolt assemblies 48, for example.

The tie down assemblies of this disclosure provide tie down points for securing roof loads and mounting locations for securing numerous accessories while also providing a unique styling element to the vehicle. The tie down assemblies therefore improve vehicle usability and increase the users' ability to accessorize their vehicles.

Although the different non-limiting embodiments are illustrated as having specific components or steps, the embodiments of this disclosure are not limited to those particular combinations. It is possible to use some of the components or features from any of the non-limiting embodiments in combination with features or components from any of the other non-limiting embodiments.

It should be understood that like reference numerals identify corresponding or similar elements throughout the several drawings. It should be understood that although a particular component arrangement is disclosed and illustrated in these exemplary embodiments, other arrangements could also benefit from the teachings of this disclosure.

The foregoing description shall be interpreted as illustrative and not in any limiting sense. A worker of ordinary skill in the art would understand that certain modifications could come within the scope of this disclosure. For these reasons, the following claims should be studied to determine the true scope and content of this disclosure.

What is claimed is:

1. A vehicle tie down assembly, comprising:
a base plate;
an overmold received over the base plate;
a cover received over the overmold,
wherein, together, the base plate, the overmold, and the cover establish a pass-through that is sized to accommodate a tie down, and wherein the vehicle tie down assembly is mountable to an inner shelf of a vehicle fender.

2. The vehicle tie down assembly as recited in claim 1, wherein the inner shelf is supported by a fender support bracket.

3. The vehicle tie down assembly as recited in claim 2, comprising a fender stiffener extending between the inner shelf and the fender support bracket.

4. The vehicle tie down assembly as recited in claim 3, wherein the vehicle tie down assembly is mountable to each of the inner shelf, the fender support bracket, and the fender stiffener.

5. A vehicle tie down assembly, comprising:
a base portion;
a nose portion extending from the base portion;
a pass-through formed through the base portion;
a bolt assembly received within a hole formed through the base portion,
wherein the bolt assembly extends along a longitudinal axis that is parallel to a width of the pass-through.

6. The vehicle tie down assembly as recited in claim 5, wherein the vehicle tie down assembly is mounted to a vehicle fender.

7. The vehicle tie down assembly as recited in claim 5, wherein, together, a base plate, an overmold, and a cover of the vehicle tie down assembly establish the base portion, the nose portion, and the pass-through.

* * * * *